US012682279B2

(12) United States Patent
Wittman et al.

(10) Patent No.: US 12,682,279 B2
(45) Date of Patent: Jul. 14, 2026

(54) REINFORCEMENT MACHINE LEARNING FRAMEWORK FOR DYNAMIC DEMAND FORECASTING

(71) Applicant: Amadeus S.A.S., Biot (FR)

(72) Inventors: Michael Wittman, Copenhagen (DK);
Thomas Fiig, Rungsted Kyst (DK);
Riccardo Jadanza, Biot (FR);
Giovanni Gatti Pinheiro, Biot (FR);
Michael Defoin Platel, Les Adrets de l'Esterel (FR)

(73) Assignee: Amadeus S.A.S., Biot (FR)

( * ) Notice: Subject to any disclaimer, the term of this patent is extended or adjusted under 35 U.S.C. 154(b) by 979 days.

(21) Appl. No.: 17/740,770

(22) Filed: May 10, 2022

(65) Prior Publication Data

US 2023/0054692 A1    Feb. 23, 2023

Related U.S. Application Data

(60) Provisional application No. 63/235,441, filed on Aug. 20, 2021.

(51) Int. Cl.
*G06N 20/00* (2019.01)
*G06Q 10/02* (2012.01)
*G06Q 30/0201* (2023.01)

(52) U.S. Cl.
CPC ............. *G06N 20/00* (2019.01); *G06Q 10/02* (2013.01); *G06Q 30/0206* (2013.01)

(58) Field of Classification Search
CPC ........ G06N 20/00; G06N 3/006; G06Q 10/02; G06Q 30/0206
See application file for complete search history.

(56) References Cited

U.S. PATENT DOCUMENTS

| | | |
|---|---|---|
| 10,402,754 B1 | 9/2019 | Walsh |
| 10,949,894 B1 * | 3/2021 | Bansal ............... G06Q 30/0206 |
| 2002/0161689 A1 * | 10/2002 | Segal .................... G06Q 40/04 |
| | | 705/37 |
| 2003/0225593 A1 | 12/2003 | Ternoey et al. |
| 2014/0149183 A1 | 5/2014 | Liu et al. |
| 2016/0055505 A1 | 2/2016 | Rana et al. |

(Continued)

OTHER PUBLICATIONS

U.S. Patent and Trademark Office, Final Office Action issued in U.S. Appl. No. 17/518,802 on Oct. 7, 2024; 15 pages.

(Continued)

*Primary Examiner* — Tan H Tran

(74) *Attorney, Agent, or Firm* — Thompson Hine LLP

(57) ABSTRACT

Systems and methods for implementing a reinforcement machine learning framework for dynamic demand forecasting. A method includes generating estimated booking data for an initial time with a demand model trained using a training set of historical booking data. A variance is detected between the estimated booking data and transient booking data observed at the initial time that exceeds a defined threshold. In response to detecting the variance, a reinforcement learning service is activated. An updated training set including enhanced booking data observed at a subsequent time is created after activating the reinforcement learning service. A parameter of the demand model is updated by training the demand model using the updated training set.

20 Claims, 11 Drawing Sheets

*300*

(56) References Cited

U.S. PATENT DOCUMENTS

| | | | |
|---|---|---|---|
| 2016/0180256 | A1 | 6/2016 | Renaud et al. |
| 2016/0210564 | A1* | 7/2016 | Guillard .................. G06Q 10/02 |
| 2017/0161409 | A1 | 6/2017 | Martin |
| 2017/0213159 | A1* | 7/2017 | Hartmans .............. G06Q 50/12 |
| 2017/0270543 | A1* | 9/2017 | Dwivedi .............. G06Q 10/067 |
| 2018/0089600 | A1 | 3/2018 | Fox |
| 2019/0172082 | A1 | 6/2019 | Mahapatruni et al. |
| 2019/0244230 | A1 | 8/2019 | Subramanian et al. |
| 2019/0347681 | A1 | 11/2019 | Liu et al. |
| 2020/0057918 | A1 | 2/2020 | Shin et al. |
| 2020/0411168 | A1* | 12/2020 | Thomas ........... G06Q 10/06311 |
| 2022/0084083 | A1* | 3/2022 | He ......................... G06N 3/006 |
| 2022/0138783 | A1 | 5/2022 | Vakhutinsky et al. |

OTHER PUBLICATIONS

Price, I. et al., "Gaussian Process for Demand Unconstraining." European Journal of Operational Research, arXiv:1711.10910, Nov. 29, 2017, 29 pages.

U.S. Patent and Trademark Office, Non-Final Office Action issued in U.S. Appl. No. 17/518,802 on May 24, 2023, 23 pages.

U.S. Patent and Trademark Office, Non-Final Office Action issued in U.S. Appl. No. 17/518,802 on Mar. 21, 2024; 48 pages.

U.S. Patent and Trademark Office, Final Office Action issued in U.S. Appl. No. 17/518,802 on Sep. 20, 2023; 44 pages.

Aviv, Y. and A. Pazgal. "A Partially Observed Markov Decision Process for Dynamic Pricing." Management Science 51(9): 1400-1416 (2005).

Banerjee, T., M. Liu, and J.P. How. "Quickest Change Detection Approach to Optimal Control in Markov Decision Processes with Model Changes." Proceedings of the 2017 American Control Conference (ACC): 399-405 (2017).

Basseville, M. and I.V. Nikoforov. "Detection of abrupt changes: Theory and application." vol. 104. Prentice Hall, Englewood Cliffs, NJ (1993).

Belobaba, P.P. and C. Hopperstad, "Algorithms for revenue management in unrestricted fare markets." Proceedings of the Informs Section on Revenue Management, Cambridge, MA (2004).

Besbes, O. and D. Sauré. "Dynamic Pricing Strategies in the Presence of Demand Shifts." Manufacturing & Operations Service Management 16(4): 513-528 (2014).

Besbes, O. and A. Zeevi. "On the minimax complexity of pricing in a changing environment." Operations Research 59(1): 66-79 (2011).

Broder, J. and P. Rusmevichientong. "Dynamic pricing under a General Parametric Choice Model." Operations Research 60(4): 965-980 (2012).

Den Boer, A.V. "Tracking the market: Dynamic pricing and learning in a changing environment." European Journal of Operational Research. 247: 914-927 (2015).

Den Boer, A.V. and N.B. Keskin. "Discontinuous Demand Functions: Estimation and Pricing." Management Science 66(10): 4516-4534 (2020).

Efron, B. and R. Tibshirani. "Bootstrap Method for Standard Errors, Confidence Intervals, and Other Measures of Statistical Accuracy." Statistical Science 1(1): 54-77 (1986).

Ekroot, L. and T.M. Cover. "The Entropy of Markov Trajectories." IEEE Transactions on Information Theory 39(4): 1418-1421 (1993).

Fiig, T., K. Isler, C. Hopperstad, and P. Belobaba. "Optimization of mixed fare structures: Theory and applications." Journal of Revenue and Pricing Management 9(1): 152-170 (2010).

Fiig, T., R. Hardling, S. Pölt, and C. Hopperstad. "Demand forecasting and measuring forecast accuracy in general fare structures." Journal of Revenue and Pricing Management 13(6): 413-439 (2014).

Fiig, T., L.R. Weatherford, and M.D. Wittman. "Can demand forecast accuracy be linked to airline revenue?" Journal of Revenue and Pricing Management 18(4): 291-305 (2019).

Fiig, T., M.D. Wittman, L. Andersen, C. Föcker, R. Härdling, T. Tofteby, C. Trescases, and L. Zannier. "Revenue Management Forecasting in Times of Change: Addressing the Need for Speed." Presented at the 2020 AGIFORS Annual Symposium (2020).

Gallego, G. and G. van Ryzin. "Optimal dynamic pricing of inventories with stochastic demand over finite horizons." Management Science 40(8): 999-1020 (1994).

Garivier, A. and E. Moulines. "On Upper-Confidence Bound Policies for Switching Bandit Problems." ALT 2011: Algorithmic Learning Theory 174-188 (2011).

Hadoux, E., A. Beynier, and P. Weng. "Sequential Decision-Making under Non-stationary Environments via Sequential Change-point Detection." Proceedings of the 2014 Learning Over Multiple Contexts (LMCE), Nancy, France. 1-13 (2014).

Keller, G. and A. Rady. "Optimal Experimentation in a Changing Environment." The Review of Economic Studies 66(3): 475-507 (1999).

Keskin, N.B. and A. Zeevi. "Chasing Demand: Learning and Earning in a Changing Environment." Mathematics of Operations Research 42(2): 277-307 (2017).

Lai, T.L. "Sequential Changepoint Detection in Quality Control and Dynamical Systems." Journal of the Royal Statistical Society: Series B: 57(4): 613-644 (1995).

Talluri, K.T. and G.J. van Ryzin. "The Theory and Practice of Revenue Management." Springer Science & Business Media, New York, NY, pp. 651-655 (2005).

Philipp Bartke et al., "Benchmarking filter-based demand estimates for airline revenue management," Euro Journal on Transportation and Logistics, vol. 7, Issue 1, pp. 57-88,ISSN 2192-4376, https://doi.org/10.1007/s13676-017-0109-4 (2018).

Garrett van Ryzin et al., "Revenue Management Without Forecasting or Optimization: An Adaptive Algorithm for Determining Airline Seat Protection Levels," Management Science, vol. 46, No. 6, pp. 760-775 (Jun. 2000).

Ronald J. Balvers et al., "Actively Learning About Demand and the Dynamics of Price Adjustment," The Economic Journal, 100, pp. 882-898 (Sep. 1990).

Carvalho, A., Puterman, M. "Learning and pricing in an internet environment with binomial demands." J Revenue Pricing Manag 3, 320-336, https://doi.org/10.1057/palgrave.rpm.5170118 (2005).

Guo, J.C., "Estimation of Sell-up Potential in Airline Revenue Management Systems," Massachusetts Institute of Technology Library, http://hdl.handle.net/1721.1/45800, 71 pages (Jun. 2008).

N. Bora Keskin, Assaf Zeevi, "Dynamic Pricing with an Unknown Demand Model: Asymptotically Optimal Semi-Myopic Policies," Operations Research, vol. 62, Issue 5, https://doi.org/10.1287/opre.2014.1294, 52 pages (Jul. 1, 2014).

Arnoud V. den Boer, Bert Zwart, "Simultaneously Learning and Optimizing Using Controlled Variance Pricing," Management Science, vol. 60, No. 3, https://doi.org/10.1287/mnsc.2013.1788, pp. 770-783 (Mar. 2014).

Omar Besbes, Assaf Zeevi, "On the (Surprising) Sufficiency of Linear Models for Dynamic Pricing with Demand Learning," Management Science, vol. 61, No. 4, https://doi.org/10.1287/mnsc.2014.2031, pp. 723-739 (Apr. 2015).

Kumar, Ravi & Li, Ang & Wang, Wei. "Learning and optimizing through dynamic pricing." Journal of Revenue and Pricing Management. 17. 10.1057/s41272-017-0120-2 (2018).

Ravi Ganti, et al., "Thompson Sampling for Dynamic Pricing," Machine Learning, https://doi.org/10.48550/arXiv.1802.03050, 22 pages (Feb. 8, 2018).

Mila Nambiar et al., "Dynamic Learning and Pricing with Model Misspecification," Management Science, vol. 65, No. 11, https://doi.org/10.1287/mnsc.2018.3194, pp. 4951-5448 (Aug. 1, 2019).

Talluri, K.T. and G.J. van Ryzin. "The Theory and Practice of Revenue Management." "Estimation and Forecasting." Chapter 9. Springer Science & Business Media, New York, NY, pp. 407-433 (2005).

* cited by examiner

300

REVENUE MANAGEMENT SYSTEM   300

| | | |
|---|---|---|
| TRAINING SET COMPILER 310 | FORECASTING SERVICE 330 | AUDITING SERVICE 350 |
| DEMAND MODEL TRAINER 320 | OPTIMIZATION SERVICE 340 | REINFORCEMENT LEARNING SERVICE 360 |

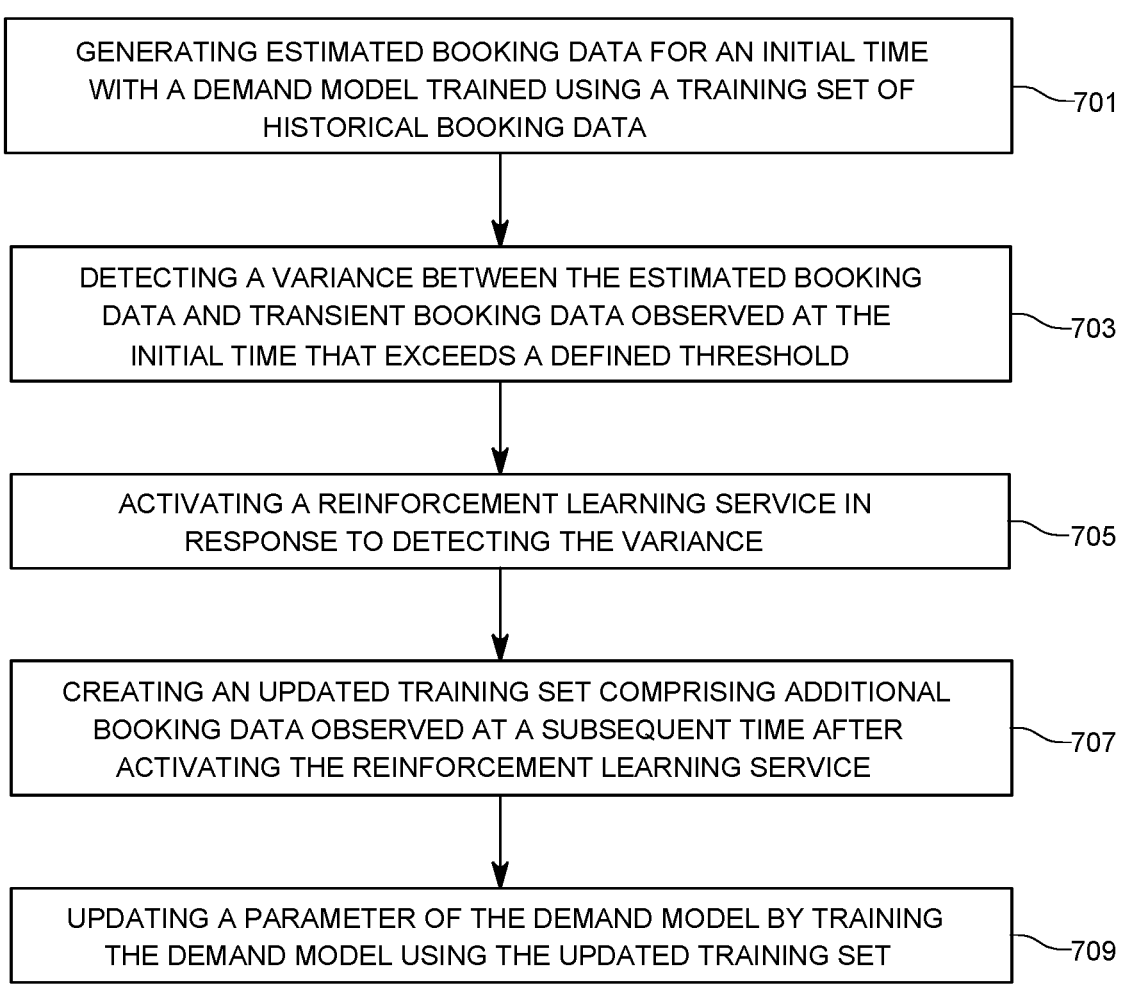

GENERATING ESTIMATED BOOKING DATA FOR AN INITIAL TIME WITH A DEMAND MODEL TRAINED USING A TRAINING SET OF HISTORICAL BOOKING DATA ~701

DETECTING A VARIANCE BETWEEN THE ESTIMATED BOOKING DATA AND TRANSIENT BOOKING DATA OBSERVED AT THE INITIAL TIME THAT EXCEEDS A DEFINED THRESHOLD ~703

ACTIVATING A REINFORCEMENT LEARNING SERVICE IN RESPONSE TO DETECTING THE VARIANCE ~705

CREATING AN UPDATED TRAINING SET COMPRISING ADDITIONAL BOOKING DATA OBSERVED AT A SUBSEQUENT TIME AFTER ACTIVATING THE REINFORCEMENT LEARNING SERVICE ~707

UPDATING A PARAMETER OF THE DEMAND MODEL BY TRAINING THE DEMAND MODEL USING THE UPDATED TRAINING SET ~709

FIG. 7

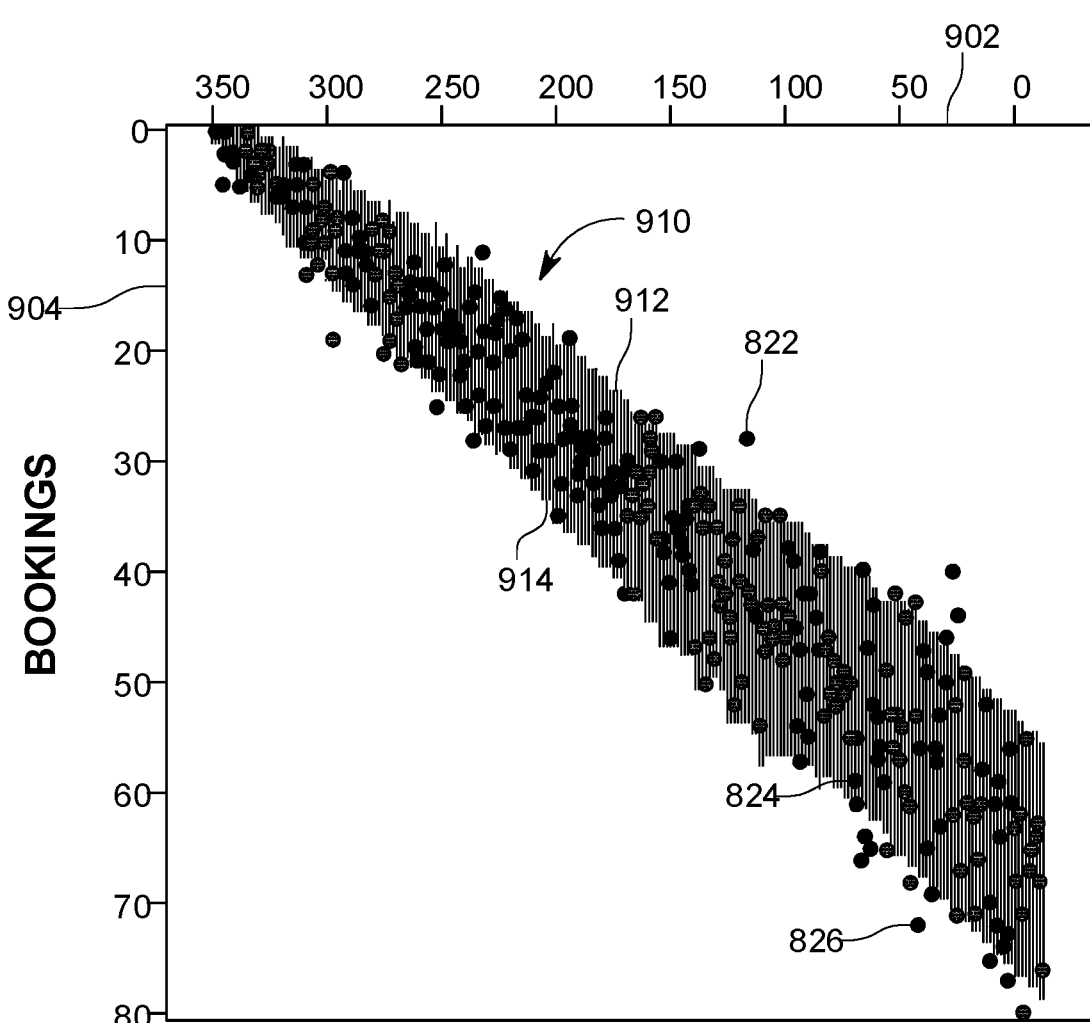
FIG. 9

REINFORCEMENT MACHINE LEARNING FRAMEWORK FOR DYNAMIC DEMAND FORECASTING

CROSS-REFERENCE TO RELATED APPLICATIONS

This application claims the benefit of U.S. Provisional Application Ser. No. 63/235,441, filed Aug. 20, 2021, which is incorporated by reference herein in its entirety.

TECHNICAL FIELD

The present invention relates generally to machine learning techniques, although not limited thereto. More specifically, the present invention relates to techniques of implementing a reinforcement machine learning framework for dynamic demand forecasting.

BACKGROUND

Revenue management systems implement various demand forecasting methodologies that estimate or predict future resource demand using historical data. For example, time series analysis or machine learning techniques may be implemented to develop models that forecast future demand based on historical data. Existing systems may implement a passive learning framework in which demand parameters are periodically estimated and it is assumed that an estimated demand function remains static between re-estimations of demand parameters. However, that assumption is less than accurate in view of constantly varying demand behavior. Such assumptions render existing systems particularly sensitive to demand shock events (e.g., natural disasters) that substantially modify demand behavior in a relatively short time. Thus, improved demand forecasting techniques are needed to remediate demand shock effects. Such systems can also struggle to estimate accurate demand forecasts if historical data contain observations at only a limited number of price points. Thus, mechanisms are needed to introduce additional price variation into historical data to ensure robust and accurate demand forecasts.

SUMMARY

Embodiments of the present invention provide systems, methods, and computer-readable storage media for providing implementing a reinforcement machine learning framework for dynamic demand forecasting. In an embodiment, a method includes generating estimated booking data for an initial time with a demand model trained using a training set of historical booking data. A variance is detected between the estimated booking data and transient booking data observed at the initial time that exceeds a defined threshold. In response to detecting the variance, a reinforcement learning service is activated. An updated training set including enhanced booking data observed at a subsequent time is created after activating the reinforcement learning service. A parameter of the demand model is updated by training the demand model using the updated training set.

These and other embodiments can each optionally include one or more of the following features.

In some embodiments of the invention, generating the estimated booking data includes computing a probability that a travel service or a flight will receive a given number of bookings by a given day-to-departure ("DTD") based on a demand forecast obtained using the demand model.

In some embodiments of the invention, the reinforcement learning service is configured to increase price disparity within an updated training set at a subsequent time based on increasing a diversity of observations of price-demand pairs.

In some embodiments of the invention, the reinforcement learning service is configured to compute an optimal probability of transitioning to an exploration mode to maximize a net value of a gain of information minus a cost of exploration, wherein the gain of information includes an expected improvement in demand model accuracy as a result of increased price diversity in an updated training set based on the exploration mode, and the cost of exploration includes a difference in expected revenue between offering an exploratory fare class selected by the exploration mode and offering the fare class that would have been selected by an exploitation mode.

In some embodiments of the invention, the updated training set is created using an offer threshold process configured to effectuate an exploration mode by modifying offer frequencies of multiple fare classes based a respective number of offers for each fare class identified within the historical booking data.

In some embodiments of the invention, modifying the offer frequencies of the multiple fare classes includes reducing an offer frequency of a given fare class with a highest number of offers among the multiple fare classes.

In some embodiments of the invention, modifying the offer frequencies of the multiple fare classes includes increasing an offer frequency of a given fare class with less than a pre-defined minimum number of offers.

In some embodiments of the invention, activating the reinforcement learning service includes selecting, by an optimization service, one or more inventory control attributes, and intercepting and processing, by the reinforcement learning service, the one or more inventory control attributes based on an exploration-exploitation strategy.

In some embodiments of the invention, the exploration-exploitation strategy includes an operating mode of transitioning between an exploration mode and an exploitation mode.

In some embodiments of the invention, the method further includes generating a confidence cone by aggregating a set of probabilities computed for multiple flights with each probability estimating a likelihood that a given flight among the multiple flights will receive a given number of bookings by a given day-to-departure ("DTD") based on a demand forecast obtained using the demand model.

In some embodiments of the invention, the updated training set contains an increased diversity of observations of price-demand pairs as a result of the activation of an exploration mode of the reinforcement learning service.

In some embodiments of the invention, the method further includes updating the training set by computing an entropy of the training set to determine an uncertainty of the demand model, identifying fare classes to explore to minimize the entropy in the updated training set, estimating a cost of exploring at each fare class, comprised of a difference in expected revenue between offering an exploratory fare class and offering the fare class that would have been selected by an exploitation mode, and selecting a fare class to explore that maximizes an expected improvement in demand model accuracy as a result of increased price diversity in the updated training set based on a maximum exploration cost threshold.

In some embodiments of the invention, the parameter includes a price elasticity parameter, a product attractiveness parameter, a demand volume parameter, or a temporal adjustment parameter. Additionally, in some implementations, the parameters may further include a competitor pricing parameter, a competitor switching sensitivity parameter, a substitute resource pricing parameter, a complement resource pricing parameter, or a seasonal adjustment parameter.

In some embodiments of the invention, a system includes one or more processors, at least one memory device coupled with the one or more processors, and a data communications interface operably associated with the one or more processors, where the at least one memory device contains a plurality of program instructions that, when executed by the one or more processors, cause the system to perform steps. In an embodiment, the steps include generating estimated booking data for an initial time with a demand model trained using a training set of historical booking data. A variance is detected between the estimated booking data and transient booking data observed at the initial time that exceeds a defined threshold. In response to detecting the variance, a reinforcement learning service is activated. An updated training set including enhanced booking data observed at a subsequent time is created after activating the reinforcement learning service. A parameter of the demand model is updated by training the demand model using the updated training set.

In some embodiments of the invention, a computer program product includes a non-transitory computer-readable storage medium, and program code stored on the non-transitory computer-readable storage medium that, when executed by one or more processors, causes the one or more processors to perform steps. In an embodiment, the steps include generating estimated booking data for an initial time with a demand model trained using a training set of historical booking data. A variance is detected between the estimated booking data and transient booking data observed at the initial time that exceeds a defined threshold. In response to detecting the variance, a reinforcement learning service is activated. An updated training set including enhanced booking data observed at a subsequent time is created after activating the reinforcement learning service. A parameter of the demand model is updated by training the demand model using the updated training set.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The accompanying drawings, which are incorporated in and constitute a part of this specification, illustrate various embodiments of the present invention and, together with the general description of the invention given above, and the detailed description of the embodiments given below, serve to explain the embodiments of the invention. In the drawings, like reference numerals are used to indicate like parts in the various views.

FIG. 7 is a flow-chart illustrating an example of a method of implementing a reinforcement learning framework for iteratively training a demand model, in accordance with an embodiment of the invention.

FIG. 9 is a graphical view comparing the estimated booking data from FIG. 8 with estimated booking data generated after updating one or more parameters of the demand model.

DETAILED DESCRIPTION

Techniques described herein relate to implementing a reinforcement learning framework for iteratively training a demand (or forecast) model. Demand forecasting generally involves predicting future resource demand using historical data. To that end, machine learning and/or predictive analytic methodologies (e.g., regression algorithms) are used to train models that estimate relationships between demand and one or more features identified within the historical data. Implementing trained models enable a computing device (e.g., a revenue management system) to execute automated, data driven decisions concerning managed resources as the computing device receives new observations. Such demand forecasting techniques may be implemented in various contexts, including energy utilities, on-demand cloud computing platforms, travel reservation systems, and the like.

Figure 1:
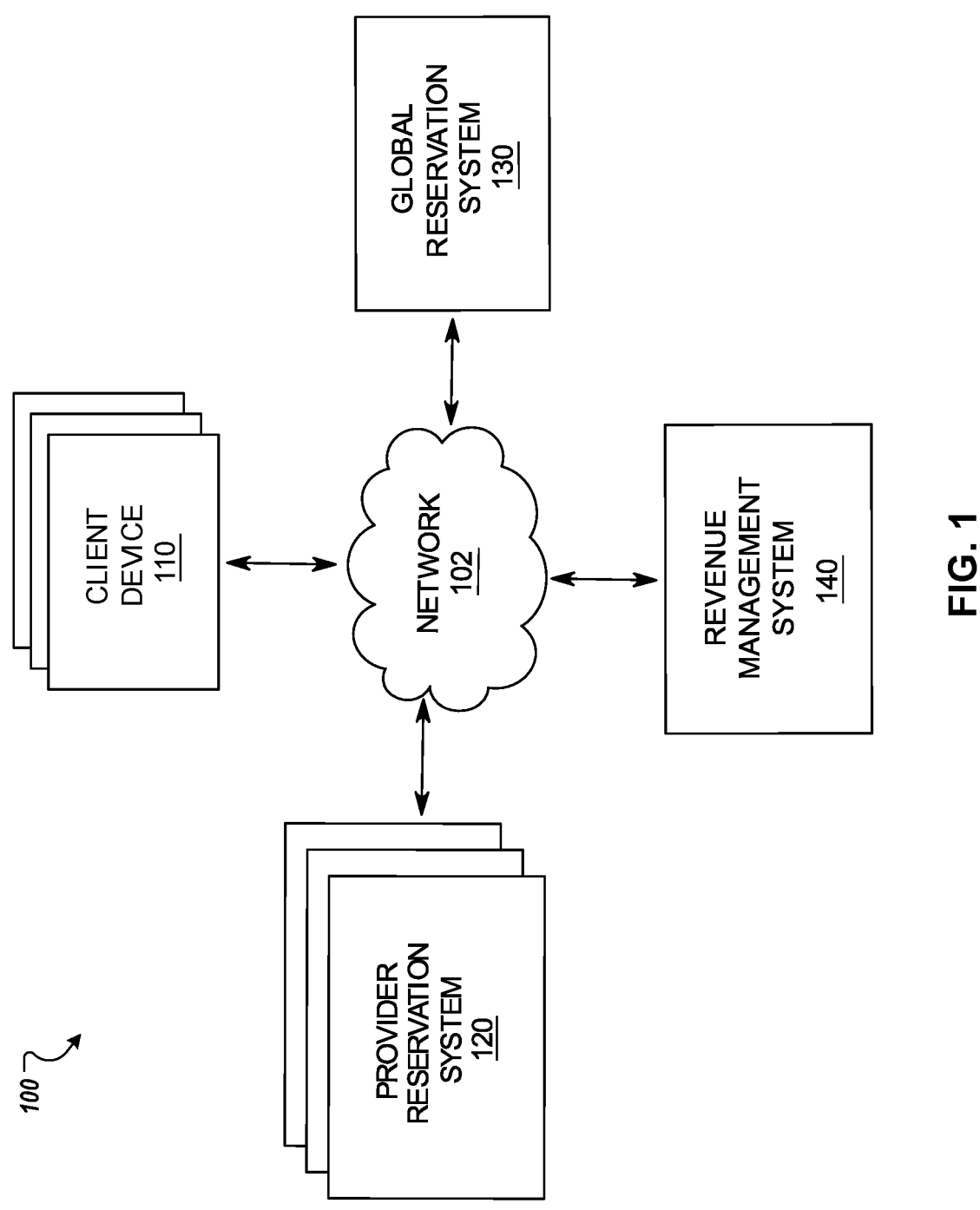
FIG. 1 is a block diagram of an example operating environment that is suitable for implementing aspects of the present invention.

FIG. 1 illustrates an example operating environment for implementing aspects of the present invention is illustrated and designated generally 100. In general, operating environment 100 represents the various systems involved in processing travel reservations for users (e.g., customers or passengers) in the travel industry. Operating environment 100 includes client device 110, provider reservation system (PRS) 120, global reservation system (GRS) 130, and revenue management system (RMS) 140. As depicted in FIG. 1, the various systems communicate with each other via network 102, which may include one or more public and/or private networks. Examples of networks that are suitable for implementing network 102 include: local area networks (LANs), wide area networks (WANs), cellular network, the Internet, and the like.

In operation, client device 110 interacts with PRS 120 and/or GRS 130 to obtain data related to travel services ("travel-related data") and services related to booking travel services ("travel-related services"). Examples of travel-related data include inventory data, fare data, routing data, scheduling data, and the like. Examples of travel-related services include reserving travel services that define an itinerary, ticketing the reserved travel services that define an itinerary, and the like. For the purposes of the present disclosure, an "itinerary" refers to a structured travel route between an origin location and a destination location. Examples of systems suitable for implementing client device 110 include: a smartphone, a laptop, a personal computer, a mobile computing device, a cryptic terminal, a remote server hosting a travel metasearch website, and the like.

PRS 120 is a computer reservation system configured to provide customers with both travel-related data and travel-related services associated with a particular travel provider.

GRS 130 is another computer reservation system configured to provide customers with both travel-related data and travel-related services. In contrast to PRS 120, the travel-related data and travel-related services that GRS 130 provides is associated with multiple travel providers. In an embodiment, a reservation system described below with respect to FIG. 2 may be used to implement PRS 120, GRS, 130, or a combination thereof.

In an embodiment, GRS 130 directly accesses travel-related data associated with a particular travel provider using a web service interface published by a remote server hosting that travel-related data. For example, an inventory management system of PRS 120 may publish a web service interface for accessing travel-related data associated with a particular travel provider. In an embodiment, a remote server periodically pushes travel-related data associated with a particular travel provider to GRS 130 where that travel-related data is locally replicated. For example, an inventory management system of PRS 120 may periodically push travel-related data associated with a particular travel provider to GRS 130 for local replication. In an embodiment, GRS 130 stores and manages travel-related data for PRS 120.

Each of the systems shown in FIG. 1 may be implemented via any type of computing system, such as computing system 1200 described in greater detail below with respect to FIG. 12, for example. Each system shown in FIG. 1 may include a single device or multiple devices cooperating in a distributed environment. For instance, GRS 130 may be provided via multiple devices arranged in a distributed environment that collectively provide the functionality described herein. Additionally, other components not shown may also be included within the distributed environment.

Figure 2:
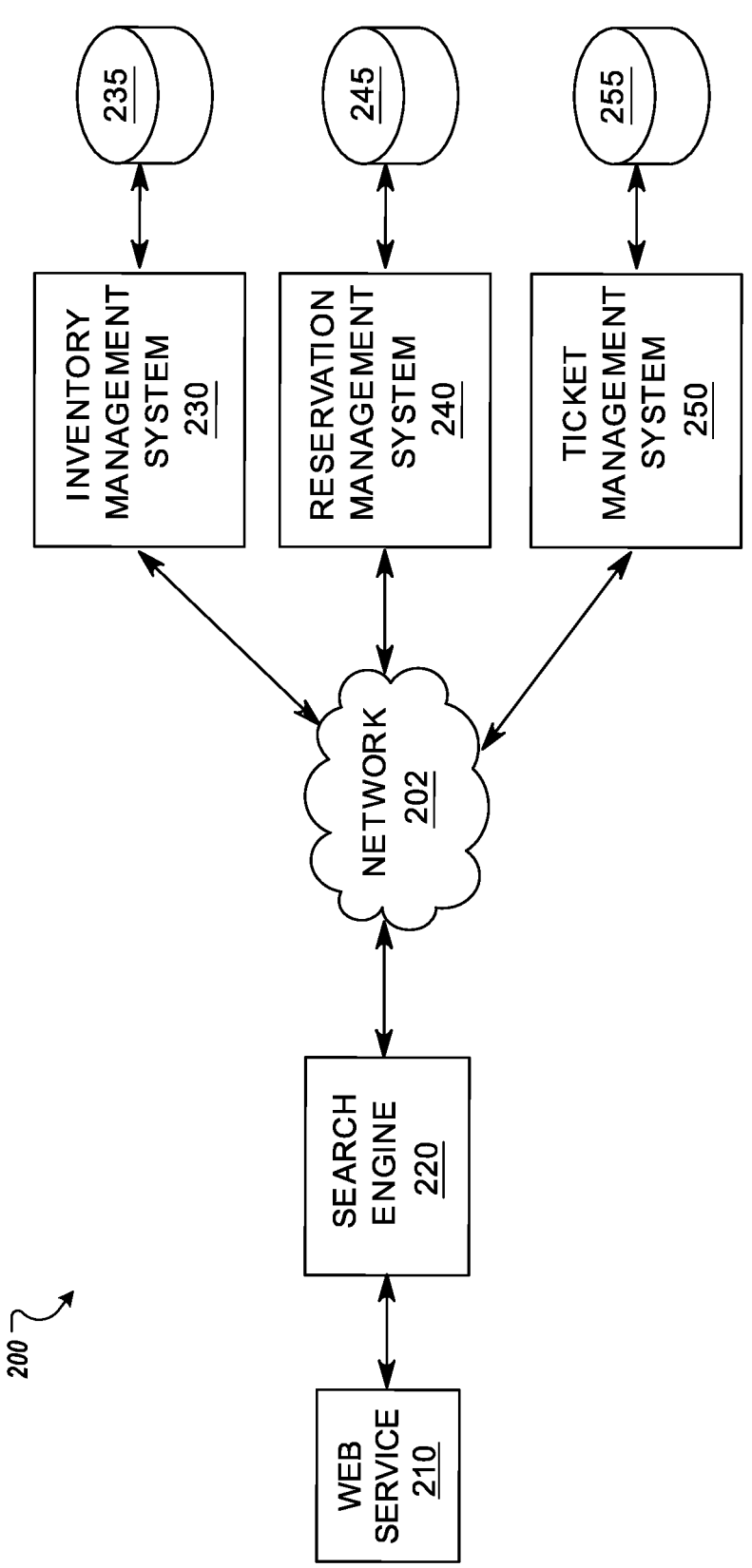
FIG. 2 is a block diagram of an example reservation system that is suitable for implementing aspects of the present invention.

FIG. 2 is a block diagram depicting an example reservation environment 200 that is suitable for implementing aspects of the present invention. In an embodiment, reservation environment 200 is implemented by PRS 120 of FIG. 1. Alternatively, in an embodiment, reservation environment 200 is implemented by GRS 130. As depicted in FIG. 2, reservation environment 200 includes front-end systems and back-end systems that exchange data via a network 202 composed of public and private networks, such as the Internet and a reservation system intranet. Front-end systems, such as search engine 220, interact directly with clients (e.g., client device 110 of FIG. 1) of reservation environment 200 during a travel reservation process. In contrast, clients of reservation environment 200 are not exposed to back-end systems that store the travel-related data and effectuate the travel-related services in reservation environment 200, such as inventory management system 230, reservation management system 240, and ticket management system 250.

Web service 210 is configured to facilitate networked communications between front-end systems of reservation environment 200, such as search engine 220, and applications executing on a remote client device (e.g., client device 110 of FIG. 1). For example, during a search phase of a travel reservation process, search queries submitted by clients of reservation environment 200 are directed to search engine 220 via web service 210. Search engine 220 is configured to identify search results having at least one itinerary that satisfies search parameters included in each search query. Examples of such search parameters may include: an origin location, a destination location, a departure date, a return date, a number of passengers associated with a travel request ("a number in party"), a booking class, a number of stops, a flight number, a travel provider identifier, a cabin class (e.g., First Class or Economy), and the like. Search engine 220 is further configured to communicate identified search results to the client devices via web service 210.

Inventory-related data for one or more travel providers is stored in inventory database 235 under the control of inventory management system 230. In an embodiment, inventory-related data includes availability information that defines unreserved travel services inventory. As used herein, "unreserved travel services inventory" relates to portions of a travel services inventory that are not associated with any reservation records stored in reservation database 245. In contrast, "reserved travel services inventory" relates to portions of a travel services inventory that are associated with one or more reservation records stored in reservation database 245. In an embodiment, inventory-related data includes fare information associated with the unreserved travel services inventory.

Reservation records for one or more travel providers are stored in reservation database 245 under the control of reservation management system 240. Reservation management system 240 is configured to interact with search engine 220 to process reservation requests received during a booking phase of a travel reservation process. In response to receiving a reservation request identifying a travel itinerary, reservation management system 240 generates a reservation record in reservation database 245. In an embodiment, the reservation record is a passenger name record ("PNR"). The reservation record includes booking data and a record locator that uniquely identifies the reservation record in reservation database 245. The record locator may also be referred to as a confirmation number, reservation number, confirmation code, booking reference, and the like.

Booking data generally includes travel information defining various travel services included in an itinerary, pricing/payment information, and passenger information related to one or more passengers associated with the reservation record. Examples of travel information include: an origin location, a destination location, a departure date, a return date, a booking date, a number in party, a booking class, a number of stops, a flight number, a travel provider identifier, a cabin class, and the like. Examples of passenger information, for each passenger among the one or more passengers associated with a reservation record, include: name, gender, date of birth, citizenship, home address, work address, passport information, and the like.

Ticket records for one or more travel providers are stored in ticketing database 255 under the control of ticket management system 250. Ticket management system 250 is configured to interact with search engine 220, inventory management system 230, and reservation management system 240 to process ticket issuance requests received during a ticketing phase of a travel reservation process. In processing ticket issuance requests, ticket management system 250 generates ticket records in ticketing database 255 for each travel service segment ("segment") and each passenger associated with the reserved travel itinerary using travel information and passenger information in the reservation record.

For example, a reservation record may include passenger information related to two passengers. The reservation record may further include travel information defining two flight segments for travel from an origin location to a destination location via a stopover location and one flight segment for travel from the destination location to the origin location. In this example, the travel information defines three total flight segments for two passengers. In response to receiving a ticket issuance request associated the reservation record in this example, ticket management system 250 would generate six ticket records in ticketing database 255. Ticket management system 250 would submit a request to reservation management system 240 to update the reservation record stored in reservation database 245 to include six ticket numbers that identify each ticket record generated. That is, in this example, a single reservation record stored in reservation database 245 would include ticket numbers identifying six ticket records stored in ticketing database 255.

Figure 3:
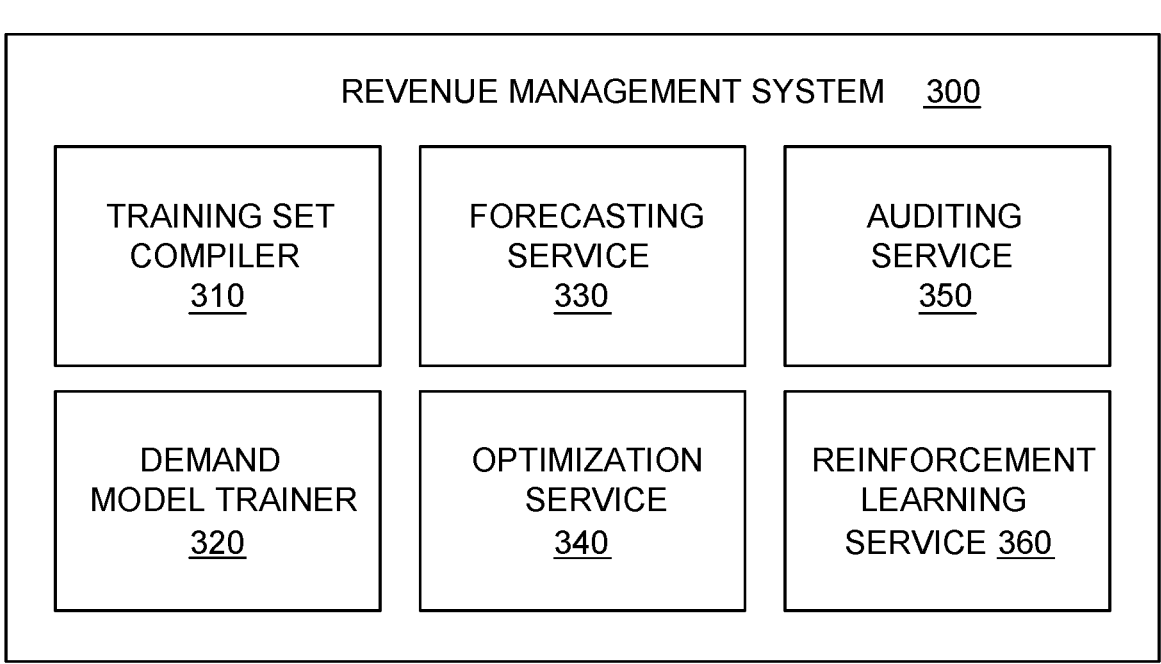
FIG. 3 is a block diagram of an example revenue management system, in accordance with an embodiment of the present invention.

FIG. 3 is a block diagram of an example revenue management system ("RMS") 300 (e.g., RMS 140 of FIG. 1) that is suitable for implementing aspects of the present invention. RMS 300 is generally configured to optimize one or more objective metrics by executing automated, data-driven decisions concerning travel services inventory using an active learning framework to iteratively train demand models. In an exemplary implementation, RMS 300 includes: training set compiler 310, demand model trainer 320, forecasting service 330, optimization service 340, auditing service 350, and reinforcement learning service 360. In an embodiment, RMS 300 is hosted by computing resources provided by reservation environment 200 of FIG. 2. Alternatively, in some implementations, one or more of the modules as shown as part of the RMS 300 (e.g., training set compiler 310, demand model trainer 320, forecasting service 330, optimization service 340, auditing service 350, and reinforcement learning service 360) may be implemented as separate components, servers, computers, etc. For example, the, auditing service 350 and/or the reinforcement learning service 360 may be systems that are interpedently controlled outside of the RMS 300.

Training set compiler 310 is configured to populate, compile, or build training sets of booking data by interacting with reservation management system 240. Demand model trainer 320 is configured to train one or more demand models using training sets obtained from training set compiler 310. In an embodiment, demand model trainer 320 is implemented using a machine learning algorithm. Forecasting service 330 is configured to generate estimated booking data for active travel services using demand models trained by demand model trainer 320.

Optimization service 340 is configured to select one or more inventory control attributes that maximize one or more objective metrics of reservation environment 200 using estimated booking data generated by forecasting service 330. Optimization service 340 is further configured to interact with inventory management system 230 to include the selected one or more inventory control attributes.

Auditing service 350 is configured to detect variances between estimated booking data generated by forecasting service 330 and transient booking data stored in reservation database 245 corresponding to active travel services departing on a future date ("active travel services"). Auditing service 350 is further configured to activate reinforcement learning service 360 in response to detecting a variance between estimated booking data and transient booking data that exceeds a calculated threshold. In an embodiment, auditing service 350 includes a demand shock detection process. In an embodiment, an auditing service 350 generates a confidence cone by aggregating a set of probabilities computed for multiple flights with each probability estimating a likelihood that a given flight among the multiple flights will receive a given number of bookings by a given day-to-departure ("DTD") based on a demand forecast obtained using the demand model trainer 320.

When activated, reinforcement learning service 360 is configured to increase price disparity within an updated training set by increasing a diversity of observations of price-demand pairs. To that end, reinforcement learning service 360 intercepts the one or more inventory control attributes selected by optimization service 340 and processes those attributes according to an exploration-exploitation strategy. The exploration-exploitation strategy includes an operating mode of reinforcement learning service 360 transitioning between an exploration mode and an exploitation mode. In an embodiment, reinforcement learning service 360 has a given probability (e.g., 5%) of transitioning to the exploration mode; otherwise, an operating mode of reinforcement learning service 360 is the exploitation mode. In an embodiment, reinforcement learning service 360 computes the optimal probability of transitioning to the exploration mode to maximize the net value of the gain of information minus the cost of exploration.

The exploitation mode of reinforcement learning service 360 defines an operating mode in which reinforcement learning service 360 forwards the one or more inventory control attributes selected by optimization service 340 to inventory management system 230. The exploration mode of reinforcement learning service 360 defines an operating mode in which reinforcement learning service 360 replaces the one or more inventory control attributes selected by optimization service 340 with alternative inventory control attributes. For example, the selected inventory control attribute may define pricing information for a given transportation service as € 250. In this example when in the exploration mode, reinforcement learning service 360 may replace the € 250 pricing information defined by the selected inventory control attribute with € 300 pricing information to create an alternative inventory control attribute. Upon replacing the inventory control attributes selected by optimization service 340, reinforcement learning service 360 forwards the alternative inventory control attribute(s) to inventory management system 230.

Figure 4:
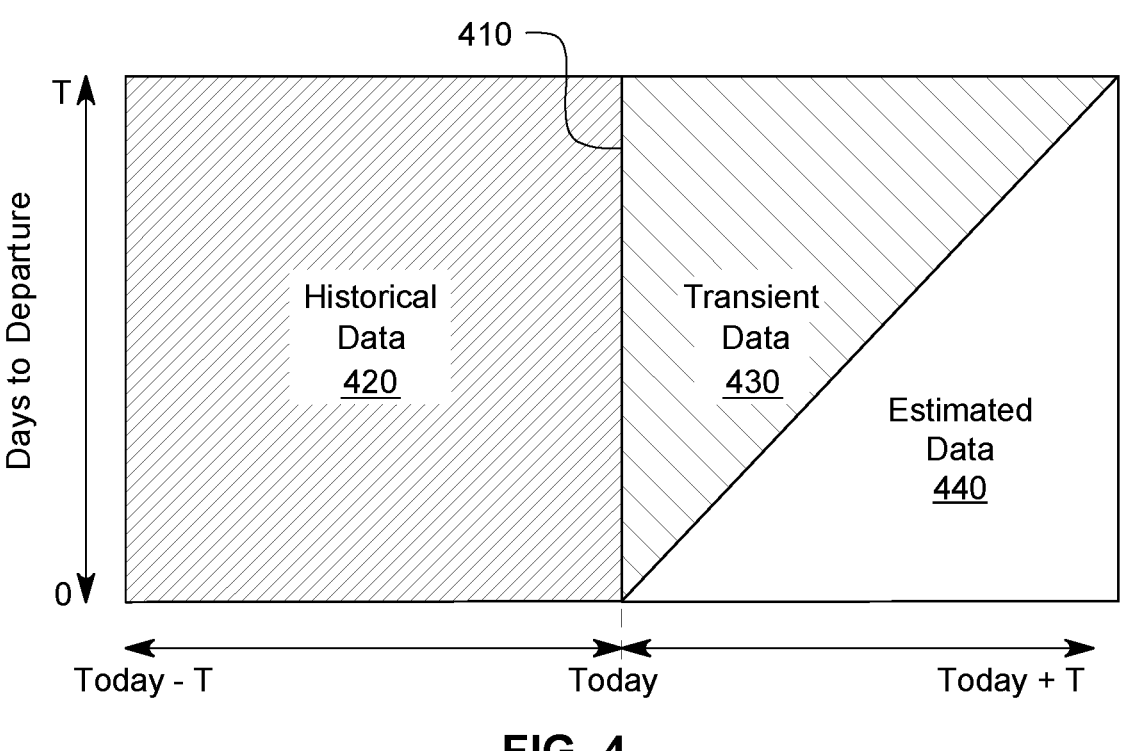
FIG. 4 illustrates a conceptual, high-level overview of using booking data in demand forecasting and resource optimization.

FIG. 4 illustrates a conceptual, high-level overview of using booking data in demand forecasting and resource optimization. As discussed above, demand forecasting techniques involving models trained by machine learning and/or predictive analytic methodologies may be implemented in various contexts, including travel reservation systems like reservation environment 200. Booking data stored in reservation database 245 facilitates various aspects of demand forecasting and resource optimization for reservation environment 200. As illustrated in FIG. 4, a line 410 associated with a current departure date partitions historical or archived booking data 420 corresponding to previously departed travel services ("inactive travel services") from transient booking data 430 corresponding to travel services departing on future dates ("active travel services") and estimated booking data 440 corresponding to forecasting data for active travel services (e.g., generated by forecasting service 330).

A demand model trainer (e.g., demand model trainer 320 of FIG. 3) can apply machine learning and/or predictive analytic methodologies (e.g., regression algorithms) to historical booking data 420 to train demand models. Demand models trained using historical booking data may then be used to select one or more inventory control attributes for active travel services associated with transient booking data 430 that maximize one or more objective metrics of the revenue management system 300. Such inventory control attributes may include attributes configured to: adjust availabilities among multiple fare classes for specific active travel services, cancel an active travel service to reduce supply, and the like. Examples of objective metrics include: utilization rate per segment, utilization rate per flight, revenue per segment, revenue per flight, revenue per passenger-mile, and the like.

Figure 5:
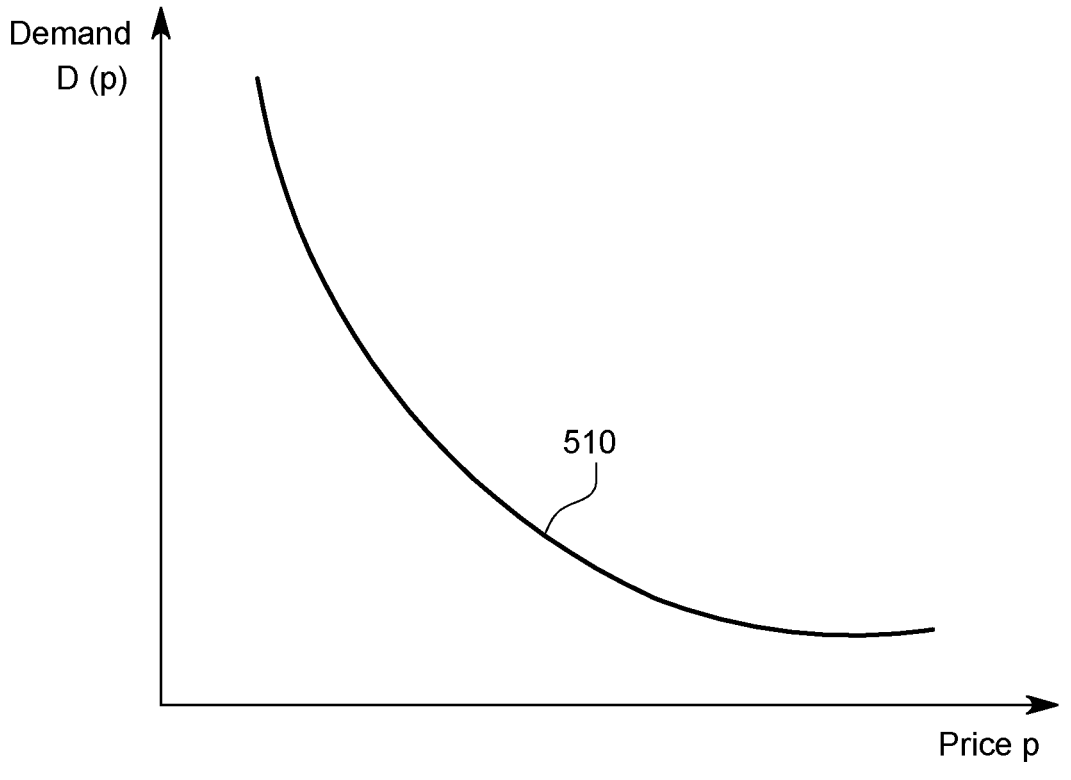
FIG. 5 illustrates a conceptual, high-level overview of an example demand model.

FIG. 5 illustrates an example of a demand model 510 that could be trained using historical booking data 420. As illustrated in FIG. 5, demand model 510 estimates demand as a function of price. One skilled in the art will appreciate that a function characterizing demand model 510 includes a number of parameters (e.g., price elasticity, product attractiveness, competitor pricing, competitor switching sensitivity, and the like) that estimate various underlying market factors that impact demand. Such parameters define a shape of demand model 510, and thus impact a measure of how well demand model 510 fits a set of observations provided by historical booking data 420. Misestimating parameters of demand model 510 may thereby negatively impact an ability of demand model 510 to forecast future demand.

Figure 6A:
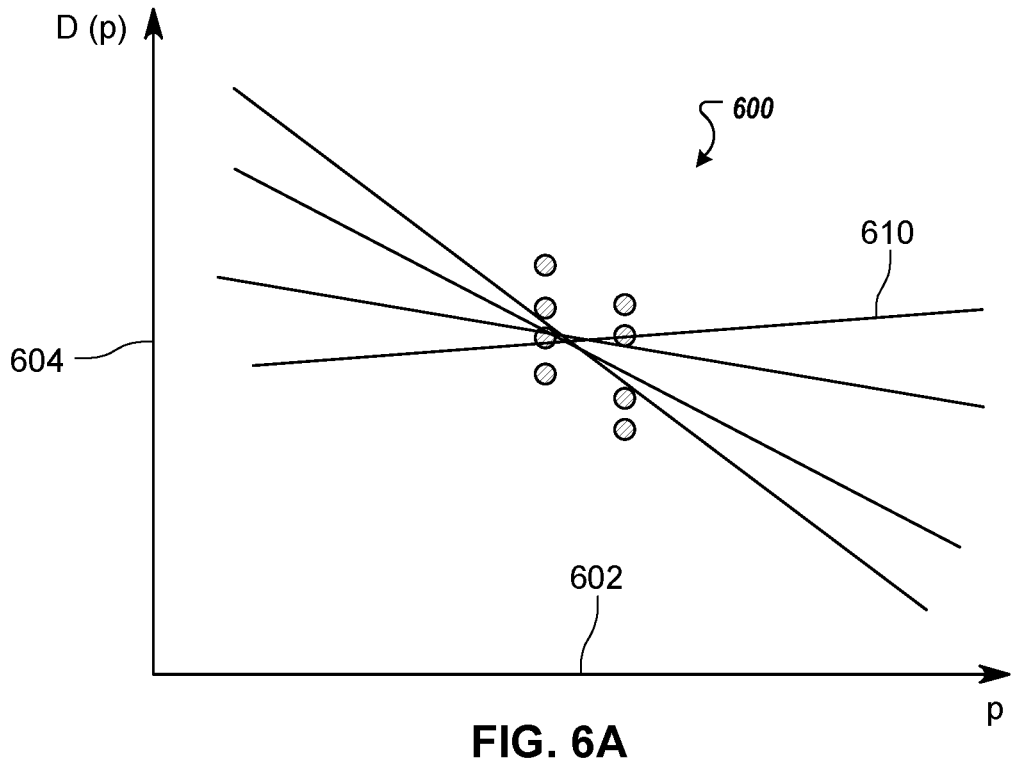
FIGS. 6A and 6B illustrate a high-level overview of data sparsity effects on demand model training, in accordance with an embodiment of the present invention.
Figure 6B:
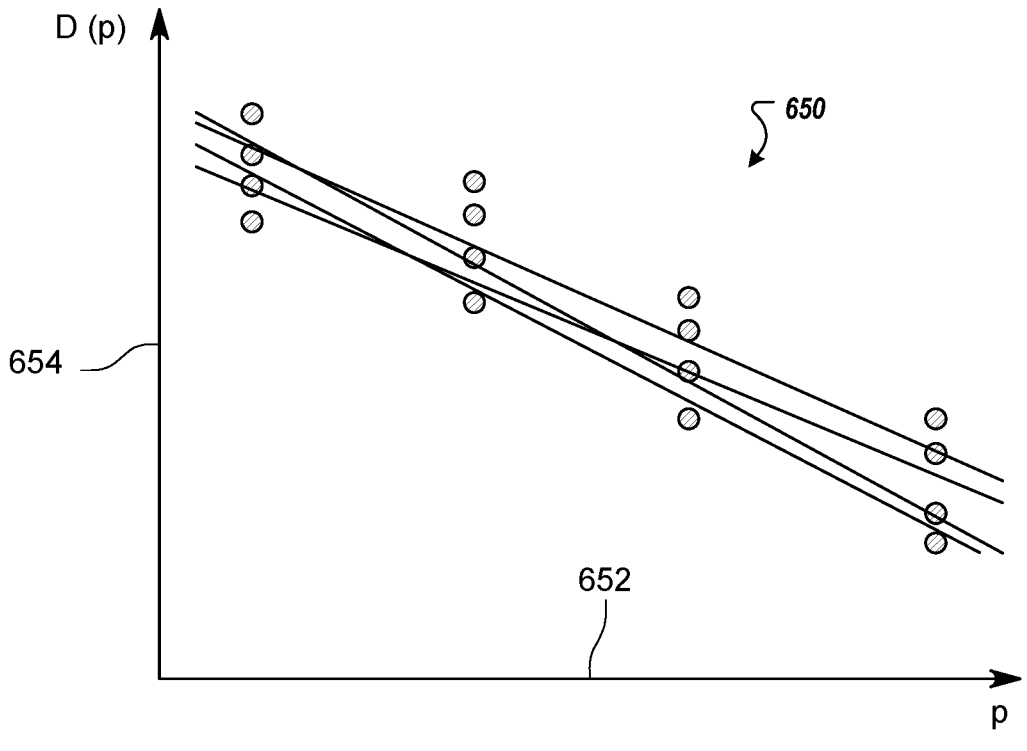

FIG. 6A and FIG. 6B illustrate data sparsity issues that may impact demand model training. For example, in some instances, historical booking data may lack sufficient data points (or observations) to train a model that accurately forecasts future demand. A comparison between FIGS. 6A and 6B illustrates how such data sparsity issues may impact demand model training. FIG. 6A illustrates an example graph 600 that includes a horizontal axis 602 corresponding to price and a vertical axis 604 corresponding to demand. The historical data presented in graph 600 includes observations of price-demand pairs largely centered about a mid-point of horizontal axis 602. As seen in FIG. 6A, machine learning and/or predictive analytic methodologies may train a wide range of demand models from such sparse historical data. In some instances, demand models trained on such sparse historical data may conflict with generally recognized principles. For example, demand model 610 estimates that increasing price of a resource will increase demand for that resource.

FIG. 6B illustrates an example graph 650 that includes a horizontal axis 652 corresponding to price and a vertical axis 654 corresponding to demand. Unlike the historical data presented in graph 600, the historical data presented in graph 650 includes observations of price-demand pairs that are both increased in number and more distributed across horizontal axis 652. That is, the observations of price-demand pairs presented in graph 650 are more diverse than those presented in graph 600. As seen in FIG. 6B, machine learning and/or predictive analytic methodologies may still train a range of demand models from such historical data. However, a comparison between FIGS. 6A and 6B illustrates that the range of demand models trained from the historical data presented in graph 650 is narrower than the range of demand models trained from the historical data presented in graph 600. This comparison suggests that a positive correlation exists between the diversity of training data provided to machine learning and/or predictive analytic methodologies and the precision of models obtained from such methodologies.

FIG. 7 is a flowchart illustrating an example method 700 of implementing a reinforcement learning framework for iteratively training a demand model, in accordance with an embodiment of the invention. In an embodiment, method 700 is implemented by revenue management system 300 of FIG. 3.

At step 701, estimated booking data is generated for an initial time with a demand model trained using a training set of historical booking data. In an embodiment, generating the estimated booking data includes computing a probability that a travel service or flight will receive a given number of bookings by a given day-to-departure ("DTD") based on a demand forecast obtained using the demand model.

At step 703, detecting a variance between the estimated booking data and transient booking data observed at the initial time that exceeds a defined threshold. In an embodiment, detecting the variance includes an outlier detection process identifying observations within the transient booking data that diverge from the estimated booking data. In an embodiment, the outlier detection process generates a confidence cone by aggregating a set of probabilities computed for multiple flights with each probability estimating a likelihood that a given flight among the multiple flights will receive a given number of bookings by a given DTD based on a demand forecast obtained using the demand model. In an embodiment, the necessary threshold is computed to detect a demand shock of a given magnitude at a given statistical accuracy within a desired detection time.

At step 705, activating a reinforcement learning service in response to detecting the variance. In an embodiment, the reinforcement learning service is configured to transition between an exploitation mode and an exploration mode. In an embodiment, the transition between the exploitation and exploration mode is determined by computing the entropy of the training data set to determine an uncertainty of the demand model estimated from the training data set. In an embodiment, the reinforcement learning service includes an Epsilon-Greedy algorithm. In an embodiment, the reinforcement learning service determines which fare classes to explore when the exploration mode is activated.

In an exemplary embodiment, step 705 may include estimating a cost of exploring at a given fare class by computing the difference in expected revenue between offering the exploratory fare class and offering the fare class that would have been selected by the exploitation mode, and selecting a fare class to explore that maximizes the expected improvement in demand model accuracy as a result of increased price diversity in the updated training set while not exceeding a maximum exploration cost threshold.

Additionally, or alternatively, in an embodiment, the reinforcement learning service includes an offer threshold process configured to effectuate the exploration mode by modifying offer frequencies of multiple fare classes based a respective number of offers for each fare class identified within the historical booking data. In an embodiment, modifying the offer frequencies of the multiple fare classes includes reducing an offer frequency of a given fare class with a highest number of offers among the multiple fare classes. Additionally, or alternatively, in an embodiment, modifying the offer frequencies of the multiple fare classes includes increasing an offer frequency of a given fare class with less than a pre-defined minimum number of offers.

At step 707, creating an updated training set including enhanced booking data observed at a subsequent time after activating the reinforcement learning service. For example, enhanced booking data may include more diverse price-demand observations than if the reinforcement learning service was not activated, due to price exploration conducted by the reinforcement learning service. For example, the increased price diversity in the updated training set may allow for more accurate demand model estimation, as seen in FIG. 6B.

At step 709, updating a parameter of the demand model by training the demand model using the updated training set. In an embodiment, the parameter includes: a price elasticity parameter, a product attractiveness parameter, a demand volume parameter, or a temporal adjustment parameter. Additionally, in some implementations, the parameters may further include a competitor pricing parameter, a competitor switching sensitivity parameter, a substitute resource pricing parameter, a complement resource pricing parameter, or a seasonal adjustment parameter.

In an embodiment, method 700 is performed by processing logic, including hardware, firmware, software, or a combination thereof. In an embodiment, method 700 is performed by a processor executing code stored in a non-transitory computer-readable medium (e.g., a memory).

Figure 8:
FIG. 8 is a graphical view comparing active booking data with estimated booking data generated using a demand model, in accordance with an embodiment of the invention.

FIG. 8 illustrates a graphical view comparing active booking data with estimated booking data generated using a demand model, in accordance with an embodiment of the invention. In particular, FIG. 8 presents graph 800 that includes a horizontal axis 802 corresponding to days to departure and a vertical axis 804 corresponding to current bookings. In general, graph 800 illustrates a comparison between estimated booking data generated by forecasting service 330 and transient booking data stored in reservation database 245 corresponding to active travel services. Each observation or data point (e.g., observations 822, 824, and/or 826) in graph 800 represents a particular travel service (e.g., flight) that is scheduled to depart on a future date.

As seen in graph 800, each travel service typically has a minimal number of bookings (e.g. zero bookings) when initially released by inventory management system 230 for booking on or about 350 days to departure (or other various departure days, depending on the airline). Over time the number of bookings associated with each active travel service increases as available spaces on a given travel service are booked and transitioned from unreserved travel services inventory to reserved travel services inventory. Spaces in unreserved travel services inventory generally remain unbooked when inventory management system 230 closes booking for each travel service on or about zero days to departure. By tracking a number of bookings for each travel service from a time that inventory management system 230 initially releases a given travel service for booking to a time that inventory management system 230 closes booking, the observations in graph 800 collectively represent transient booking data (e.g., transient booking data 430 of FIG. 4).

In FIG. 8, that transient booking data (e.g., transient booking data 430) is overlaid by the estimated booking data (e.g., estimated booking data 440) generated by forecasting service 330, which is represented by confidence cone 810. As illustrated in FIG. 8, a substantial number of observations in the transient booking data (including observations 822, 824, and 826) exist external to an upper confidence bound 812 and a lower confidence bound 814 of confidence cone 810. That is, a substantial number of observations diverge from confidence cone 810. If that substantial number of observations exceeds a defined threshold for activating reinforcement learning service 360, one or more parameters of the demand model associated with confidence cone 810 may be updated at a subsequent time by retraining the demand model using an updated training set including enhanced booking data with increased price diversity, as discussed above. In an embodiment, the updated training set is generated and the demand parameters are updated whether or not the exploration mode in reinforcement learning service 360 is activated. For example, the only difference is whether or not the prices used in the generation of the updated training set involve price experimentation or not. Upon retaining the demand model using the updated training set, confidence cone 910 may be generated.

FIG. 9 illustrates a graphical view comparing the estimated booking data from FIG. 8 with estimated booking data generated after updating one or more parameters of the demand model from an updated training set. In particular, FIG. 9 presents graph 900 that includes a horizontal axis 902 corresponding to days to departure and a vertical axis 904 corresponding to current bookings. As illustrated in FIG. 9, some observations in the transient booking data (e.g., 822 and 826) remain external to an upper confidence bound 912 and a lower confidence bound 914 of confidence cone 910. However, a comparison between FIGS. 8 and 9 illustrates that fewer observations in the transient booking data diverge from confidence cone 910 than diverged from confidence cone 810. For example, observation 824 exists internal to upper confidence bound 912 and lower confidence bound 914 of confidence cone 910. As such, the one or more parameters that were updated by retraining the demand model using the updated training set positively impacted the accuracy of demand predictions generated using the retrained demand model.

Figure 10:
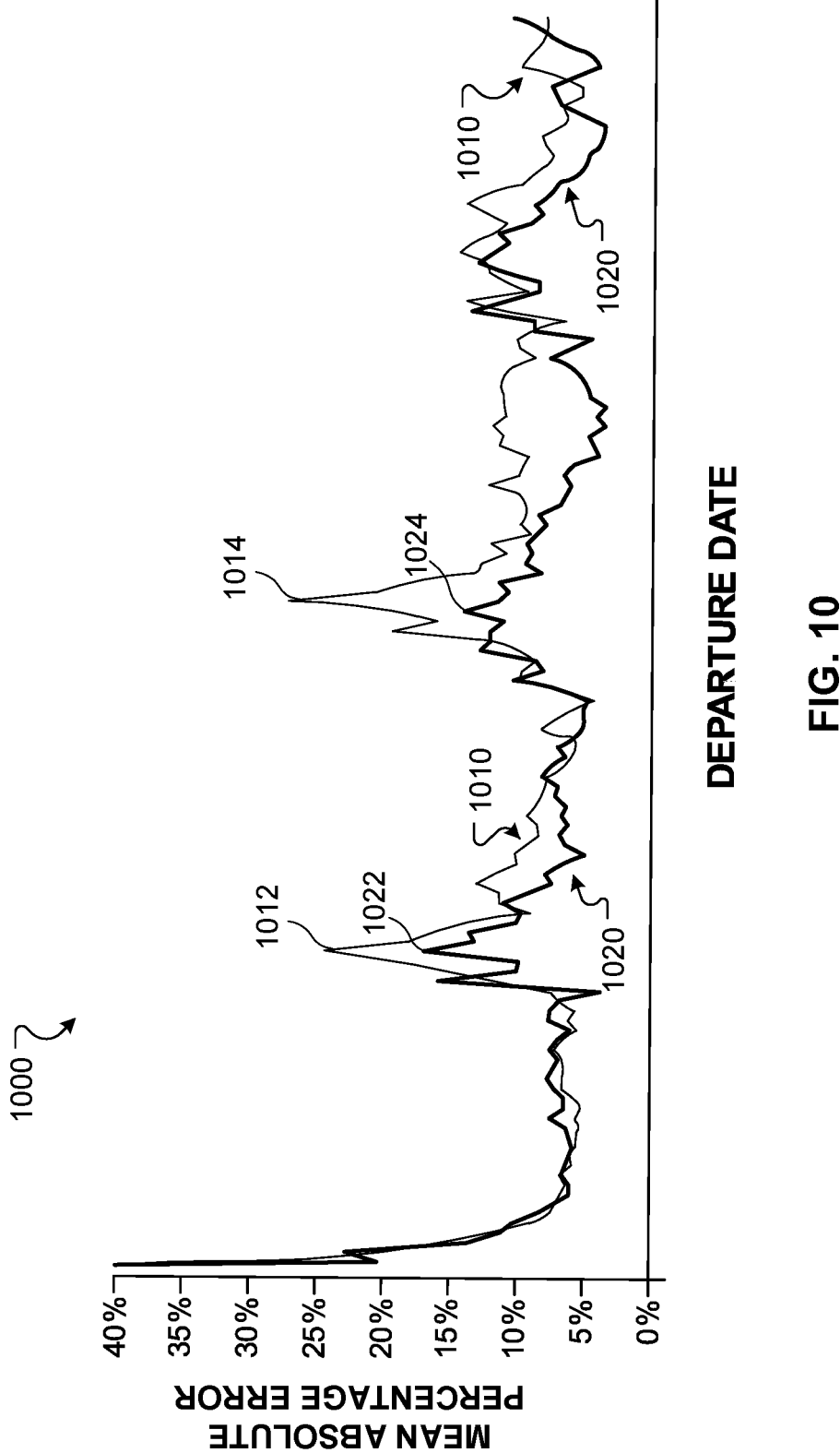
FIG. 10 is a graphical view comparing respective mean absolute percentage error of revenue management systems implementing passive and active learning frameworks over time, in accordance with an embodiment of the invention.

FIG. 10 is an example graph 1000 illustrating a graphical view comparing respective mean absolute percentage error of revenue management systems implementing passive and active learning frameworks over time, in accordance with an embodiment of the invention. For example, graph 1000 illustrates a mean absolute percentage error on the vertical axis over time (e.g., departure date) on the horizontal axis. In particular, graph 1000 illustrates a comparison for percentage variances between a forecast error in an estimated parameter for RMS that uses passive learning (e.g., passive learning results 1010), and a forecast error in an estimated parameter for an RMS that uses active learning (e.g., active learning results 1020). Thus, as illustrated, the active learning results 1020 generally have a lower forecasted error than the passive learning results 1010. In particular, the peaks 1022, 1024 for the active learning results 1020 have a forecast error that is reduced in magnitude than peaks 1012, 1014 for the passive learning results 1010.

Figure 11:
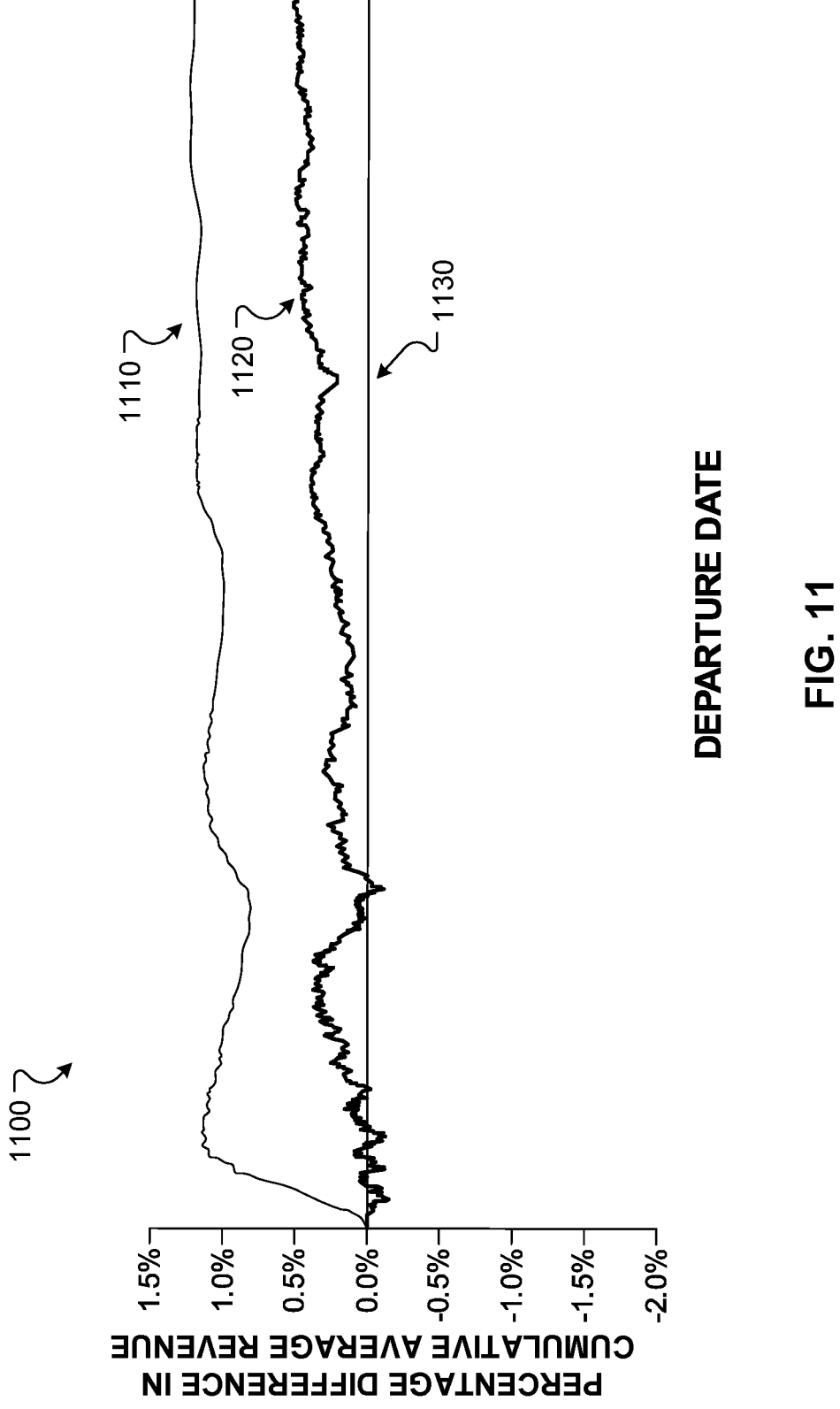
FIG. 11 is a graphical view comparing respective average cumulative revenue results of revenue management systems implementing passive and active learning frameworks over time, in accordance with an embodiment of the invention.

FIG. 11 is an example graph 1100 illustrating a graphical view comparing respective average cumulative revenue results of revenue management systems implementing passive and active learning frameworks over time, in accordance with an embodiment of the invention. For example, graph 1100 illustrates a percentage difference in cumulative average revenue on the vertical axis over time (e.g., departure date) on the horizontal axis. In particular, graph 1100 illustrates a comparison for percentage differences between a revenue performance metric for a hypothetical psychic RMS with perfect knowledge of customer behavior (e.g., hypothetical optimal results 1110), and a revenue performance metric for an RMS with active learning (e.g., active learning results 1120) with respect to a RMS baseline with passive learning (e.g., passive learning results 1130). As illustrated in graph 1100, the revenue performance metric for an RMS with active learning (e.g., active learning results 1120) exceeds the revenue performance metric for the baseline RMS with passive learning (e.g., passive learning results 1130) and more closely approaches the hypothetical psychic RMS (e.g., hypothetical optimal results 1110) in the revenue performance metric throughout the entire simulation.

Figure 12:
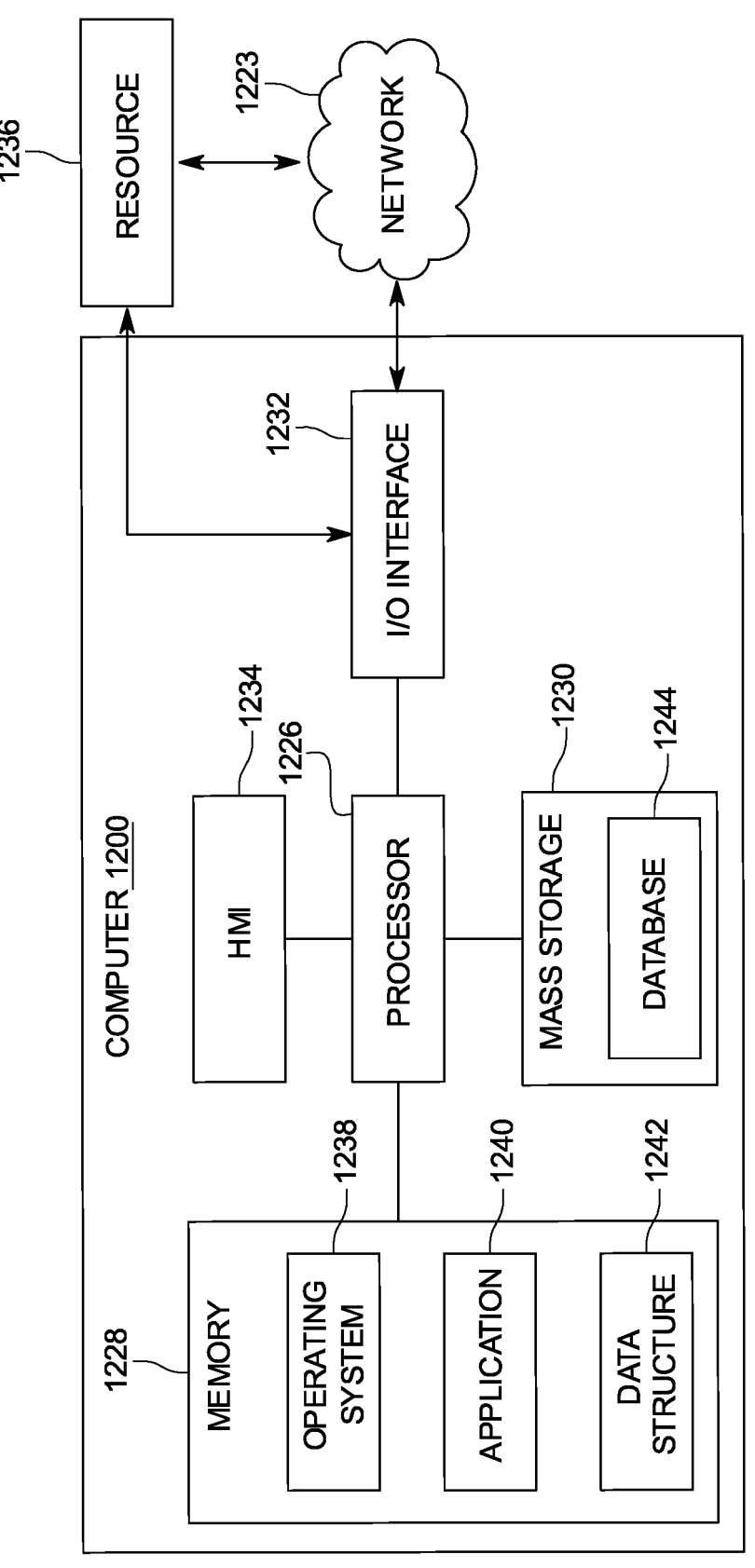
FIG. 12 is a block diagram of an example computing environment suitable for use in implementing embodiments of the invention.

FIG. 12 illustrates an example computer system 1200 for executing the software components described herein for the sending/receiving and processing of tasks. With reference to FIG. 12, client device 110; provider reservation system 120; global reservation system 130; RMS 140, reservation environment 200; search engine 220; inventory management system 230; reservation management system 240; ticket management system 250; RMS 300, and any other computer system described herein, may be implemented on one or more computer devices or systems, such as exemplary computer system 1200. The computer system 1200 may include a processor 1226, a memory 1228, a mass storage memory device 1230, an input/output (I/O) interface 1232, and a Human Machine Interface (HMI) 1234. The computer system 1200 may also be operatively coupled to one or more external resources 1236 via the network 1223 or I/O interface 1232. External resources may include, but are not limited to, servers, databases, mass storage devices, peripheral devices, cloud-based network services, or any other suitable computer resource that may be used by the computer system 1200.

The processor 1226 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1228. The memory 1228 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 1230 may include data storage devices such as a hard drive, optical drive, tape drive, non-volatile solid state device, or any other device capable of storing information.

The processor 1226 may operate under the control of an operating system 1238 that resides in the memory 1228. The operating system 1238 may manage computer resources so that computer program code embodied as one or more computer software applications, such as an application 1240 residing in memory 1228, may have instructions executed by the processor 1226. In an alternative embodiment, the processor 1226 may execute the application 1240 directly, in which case the operating system 1238 may be omitted. One or more data structures 1242 may also reside in memory 1228, and may be used by the processor 1226, operating system 1238, or application 1240 to store or manipulate data.

The I/O interface 1232 may provide a machine interface that operatively couples the processor 1226 to other devices and systems, such as the network 1223 or the one or more external resources 1236. The application 1240 may thereby work cooperatively with the network 1223 or the external resources 1236 by communicating via the I/O interface 1232 to provide the various features, functions, applications, processes, or modules including embodiments of the invention. The application 1240 may also have program code that is executed by the one or more external resources 1236, or otherwise rely on functions or signals provided by other system or network components external to the computer system 1200. Indeed, given the nearly endless hardware and software configurations possible, persons having ordinary skill in the art will understand that embodiments of the invention may include applications that are located externally to the computer system 1200, distributed among multiple computers or other external resources 1236, or provided by computing resources (hardware and software) that are provided as a service over the network 1223, such as a cloud computing service.

The HMI 1234 may be operatively coupled to the processor 1226 of computer system 1200 in a known manner to allow a user to interact directly with the computer system 1200. The HMI 1234 may include video or alphanumeric displays, a touch screen, a speaker, and any other suitable audio and visual indicators capable of providing data to the user. The HMI 1234 may also include input devices and controls such as an alphanumeric keyboard, a pointing device, keypads, pushbuttons, control knobs, microphones, etc., capable of accepting commands or input from the user and transmitting the entered input to the processor 1226.

A database 1244 may reside on the mass storage memory device 1230, and may be used to collect and organize data used by the various systems and modules described herein. The database 1244 may include data and supporting data structures that store and organize the data. In particular, the database 1244 may be arranged with any database organization or structure including, but not limited to, a relational database, a hierarchical database, a network database, or combinations thereof. A database management system in the form of a computer software application executing as instructions on the processor 1226 may be used to access the information or data stored in records of the database 1244 in response to a query, where a query may be dynamically determined and executed by the operating system 1238, other applications 1240, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically includes computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed:

1. A method comprising:
generating estimated booking data for an initial time with a demand model trained using a training set of historical booking data;
obtaining transient booking data observed at the initial time, the transient booking data comprising booking records for travel services scheduled to depart on future dates;
detecting, by an auditing service, a variance between the estimated booking data and the transient booking data observed at the initial time that exceeds a defined threshold;
in response to detecting the variance, activating an exploration mode of a reinforcement learning service in response to detecting the variance, wherein the reinforcement learning service is configured to dynamically adjust exploration and exploitation in response to detected demand shocks, wherein the exploration mode comprises modifying offer frequencies or prices of multiple fare classes to increase diversity of observed price-demand pairs, wherein the reinforcement learning service intercepts one or more inventory control attributes selected by an optimization service and processes the attributes based on an exploration-exploitation strategy to increase price disparity within an updated training set by increasing a diversity of observations of price-demand pairs;
creating an updated training set comprising enhanced booking data, wherein the enhanced booking data includes booking records updated to reflect additional observations obtained during the exploration mode thereby increasing the diversity of observations of price-demand pairs in the historical booking data, wherein creating the updated training set comprises using an offer threshold process configured to effectuate the exploration mode by modifying offer frequencies of multiple fare classes based on a respective number of offers for each fare class identified within the historical booking data; and
updating a parameter of the demand model by training the demand model using the updated training set.

2. The method of claim 1, wherein generating the estimated booking data comprises:
computing a probability that a travel service or a flight will receive a given number of bookings by a given day-to-departure based on a demand forecast obtained using the demand model.

3. The method of claim 1, wherein the reinforcement learning service is configured to increase price disparity within an updated training set at a subsequent time based on increasing a diversity of observations of price-demand pairs.

4. The method of claim 1, wherein the reinforcement learning service is configured to compute an optimal probability of transitioning to the exploration mode to maximize a net value of a gain of information minus a cost of exploration, wherein the gain of information comprises an expected improvement in demand model accuracy as a result of increased price diversity in an updated training set based on the exploration mode, and the cost of exploration comprises a difference in expected revenue between offering an exploratory fare class selected by the exploration mode and offering the fare class that would have been selected by an exploitation mode.

5. The method of claim 1, wherein modifying the offer frequencies of the multiple fare classes comprises:

reducing an offer frequency of a given fare class with a highest number of offers among the multiple fare classes.

6. The method of claim 1, wherein modifying the offer frequencies of the multiple fare classes comprises:

increasing an offer frequency of a given fare class with less than a pre-defined minimum number of offers.

7. The method of claim 1, wherein the exploration-exploitation strategy comprises an operating mode of transitioning between the exploration mode and an exploitation mode.

8. The method of claim 1, further comprising:

generating a confidence cone by aggregating a set of probabilities computed for multiple flights with each probability estimating a likelihood that a given flight among the multiple flights will receive a given number of bookings by a given day-to-departure based on a demand forecast obtained using the demand model.

9. The method of claim 1, further comprising:

updating the training set by:

computing an entropy of the training set to determine an uncertainty of the demand model;

identifying fare classes to explore to minimize the entropy in the updated training set;

estimating a cost of exploring at each fare class, comprised of a difference in expected revenue between offering an exploratory fare class and offering the fare class that would have been selected by an exploitation mode; and selecting a fare class to explore that maximizes an expected improvement in demand model accuracy as a result of increased price diversity in the updated training set based on a maximum exploration cost threshold.

10. The method of claim 1, wherein the parameter comprises a price elasticity parameter, a product attractiveness parameter, a demand volume parameter, or a temporal adjustment parameter.

11. A system comprising:

one or more processors;

at least one memory device coupled with the one or more processors; and a data communications interface operably associated with the one or more processors, wherein the at least one memory device contains a plurality of program instructions that, when executed by the one or more processors, cause the system to:

generate estimated booking data for an initial time with a demand model trained using a training set of historical booking data;

obtain transient booking data observed at the initial time, the transient booking data comprising booking records for travel services scheduled to depart on future dates;

detect, by an auditing service, a variance between the estimated booking data and the transient booking data observed at the initial time that exceeds a defined threshold;

in response to detect the variance, activate an exploration mode of a reinforcement learning service in response to detecting the variance, wherein the reinforcement learning service is configured to dynamically adjust exploration and exploitation in response to detected demand shocks, wherein the exploration mode comprises modifying offer frequencies or prices of multiple fare classes to increase diversity of observed price-demand pairs, wherein the reinforcement learning service intercepts one or more inventory control attributes selected by an optimization service and processes the attributes based on an exploration-exploitation strategy to increase price disparity within an updated training set by increasing a diversity of observations of price-demand pairs;

create an updated training set comprising enhanced booking data, wherein the enhanced booking data includes booking records updated to reflect additional observations obtained during the exploration mode thereby increasing the diversity of observations of price-demand pairs in the historical booking data, wherein creating the updated training set comprises using an offer threshold process configured to effectuate the exploration mode by modifying offer frequencies of multiple fare classes based on a respective number of offers for each fare class identified within the historical booking data; and update a parameter of the demand model by training the demand model using the updated training set.

12. The system of claim 11, wherein the plurality of program instructions cause the system to generate the estimated booking data by causing the system to compute a probability that a travel service or flight will receive a given number of bookings by a given day-to-departure based on a demand forecast obtained using the demand model.

13. The system of claim 11, wherein the reinforcement learning service is configured to increase price disparity within an updated training set based on increasing a diversity of observations of price-demand pairs.

14. The system of claim 11, wherein the reinforcement learning service is configured to compute an optimal probability of transitioning to the exploration mode to maximize a net value of a gain of information minus a cost of exploration.

15. The system of claim 11, wherein the program instructions, when executed by the one or more processors, further cause the system to update the training set by causing the system to:

compute an entropy of the training set to determine an uncertainty of the demand model;

identify fare classes to explore to minimize the entropy in the updated training set;

estimate a cost of exploring at each fare class, comprised of a difference in expected revenue between offering an exploratory fare class and offering the fare class that would have been selected by an exploitation mode; and select a fare class to explore that maximizes an expected improvement in demand model accuracy as a result of increased price diversity in the updated training set based on a maximum exploration cost threshold.

16. A computer program product comprising:

a non-transitory computer-readable storage medium; and program code stored on the non-transitory computer-readable storage medium that, when executed by one or more processors, causes the one or more processors to:

generate estimated booking data for an initial time with a demand model trained using a training set of historical booking data;

obtain transient booking data observed at the initial time, the transient booking data comprising booking records for travel services scheduled to depart on future dates;

detect, by an auditing service, a variance between the estimated booking data and the transient booking data observed at the initial time that exceeds a defined threshold;

in response to detect the variance, activate an exploration mode of a reinforcement learning service in response to detecting the variance, wherein the reinforcement learning service is configured to dynamically adjust exploration and exploitation in response to detected demand shocks, wherein the exploration mode comprises modifying offer frequencies or prices of multiple fare classes to increase diversity of observed price-demand pairs, wherein the reinforcement learning service intercepts one or more inventory control attributes selected by an optimization service and processes the attributes based on an exploration-exploitation strategy to increase price disparity within an updated training set by increasing a diversity of observations of price-demand pairs;

create an updated training set comprising enhanced booking data, wherein the enhanced booking data includes booking records updated to reflect additional observations obtained during the exploration mode thereby increasing the diversity of observations of price-demand pairs in the historical booking data, wherein creating the updated training set comprises using an offer threshold process configured to effectuate the exploration mode by modifying offer frequencies of multiple fare classes based on a respective number of offers for each fare class identified within the historical booking data; and update a parameter of the demand model by training the demand model using the updated training set.

17. The method of claim 1, wherein the exploration mode is distinct from an exploitation mode that maximizes immediate revenue based on current demand estimates.

18. The method of claim 1, wherein creating the updated training set comprises determining a current uncertainty of the demand model, and driving targeted exploration by identifying fare classes whose additional observations that reduce that uncertainty and lower entropy in the updated training set.

19. The method of claim 1, wherein, in response to detected demand shocks, the auditing service initiates the reinforcement learning service in exploration mode and provides one or more contextual inputs that guide exploration-exploitation transitions.

20. The method of claim 19, wherein the one or more contextual inputs comprise at least one of magnitude, timing, and affected fare classes.

* * * * *